Aug. 20, 1929.                C. E. POTTER                    1,725,208
                         GRAVITY TANK FLOAT DEVICE
                         Filed Jan. 21, 1928         5 Sheets-Sheet 1

Inventor
Charles E. Potter
By Cornwall, Bedell & Janus
Attys.

Aug. 20, 1929.  C. E. POTTER  1,725,208
GRAVITY TANK FLOAT DEVICE
Filed Jan. 21, 1928   5 Sheets-Sheet 3

Inventor
Charles E. Potter
By Cornwall, Bedell, Janney
Attys.

Patented Aug. 20, 1929.

1,725,208

UNITED STATES PATENT OFFICE.

CHARLES E. POTTER, OF ST. LOUIS, MISSOURI.

GRAVITY-TANK FLOAT DEVICE.

Application filed January 21, 1928. Serial No. 248,437.

This invention relates to new and useful improvements in gravity tank float devices, the objects of the invention being the provision of a float device having electrical switch operable by a floatable member disposed in the tank whereby the electric signal circuit is controlled in accordance with the level of the liquid contained in the tank.

Further objects of the invention are to provide a float device which can be readily attached to a tank, with the floatable member disposed interiorly thereof, and with the electric switch arranged exteriorly of said tank. The operative connection between said floatable member and said switch being hermetically sealed to prevent leakage of the liquid contained in said tank.

Other objects of the invention are to provide a single mounting for the floatable member and the switch mechanism, and to provide a flexible sealed joint there between. Thus the positioning of the float device on the tank is facilitated and the switch mechanism and the electric circuit can be located exteriorly of the tank, without danger of leakage or of said switch mechanism coming in contact with the liquid contained in said tank.

Additional objects of the invention are to generally improve upon and simplify the construction of the device of the class described and to provide a device which is efficient and dependable in operation and which can be readily attached in position.

With these and other objects in view, my invention consists of novel features of construction and arrangement of parts hereinafter more fully described and claimed, and illustrated in the accompanying drawings in which

The present invention is designed especially for use with automatic sprinkler systems to indicate the water level in the tank, and to send to a central station a suitable signal indicating, either that the water level dropped below a pre-determined point, or that the water level has been restored to normal level. The signal is set in operation preferably by means of an electric circuit which is controlled by a suitable switch mechanism. This switch mechanism is disposed on a suitable mounting and is operable by a floatable member disposed in the tank.

Figure 1:
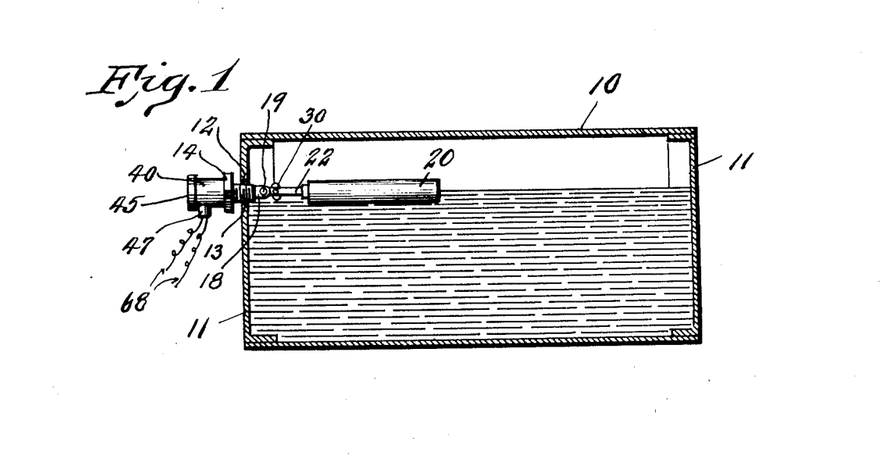
Figure 1 is a vertical section through a tank showing the float device attached thereto.
Figure 2:
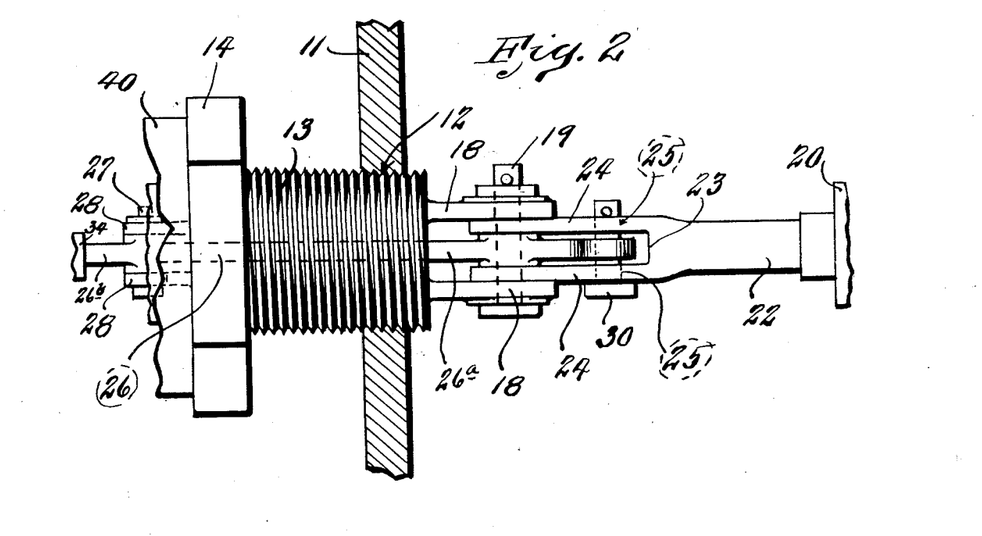
Figure 2 is an enlarged top plane view of the float device.

Referring by numerals to the accompanying drawings; 10, indicates a tank which, in the present case, is of cylindrical shape having end walls 11. One of the end walls is provided at a suitable height with a threaded opening 12, for the reception of the threaded plug 13 having a non-circular head 14. Threaded opening 12, and the threaded portion of plug 13 are tapered so as to provide a fluid tight joint when said plug is screwed in position.

This plug 13, is provided with a longitudinal bore 15, the inner end of which is enlarged and threaded as indicated at 15ª. A tubular member 16, is disposed in bore 15, and is provided with an enlarged threaded portion, 17, which is screw seated in threaded portion 15ª, and secures said tubular member in position in plug 13. The inner end of member 16, opens into the tank and is provided with a pair of spaced vertically disposed lugs 18, which project rearwardly from said end 17, and receive a horizontally disposed pin 19.

A float 20, preferably in the form of an elongated hollow member, has a threaded extension, 20$^a$, which is screw seated in the threaded end of a short arm 22. The opposite end of this arm is bifurcated as indicated at 23, to provide two parallel vertically disposed spaced portions 24, the ends of which are pivotally mounted on pin 19.

A pair of axially alined openings 25, is arranged horizontally in portions 24, at points spaced from pin 19. A lever 26, is fulcrumed on a horizontally disposed pin 27, seated in spaced lugs 28. These lugs are formed integrally with the forward end of member 16, and project outwardly beyond the non-circular head 14, of plug 13. The rear end 26$^a$ of lever 26, extends through tubular member 16, and projects into the tank and terminates between the bifurcated portions 23.

End 26$^a$ of lever 26 is provided with a horizontally disposed aperture 29 through which extends a pin 30 which is seated in opening 25. Aperture 29, which is preferably rectangular, is sufficiently large relatively to pin 30 to provide operating clearness there between. A vertically disposed slot 31 is formed in end 26$^a$ inwardly of aperture 29 for receiving pin 19 which extends transversely through said slot and is seated in lugs 18. This slot 31 is substantially concentric with fulcrum 27 and is of sufficient length to allow appropriate oscillatory movement of lever 26.

The opposite or forward end 26$^b$, of lever 26, is comparatively short and has a threaded extension 32 for engaging a centrally disposed threaded bore 33 formed on one side of a disk 34. The plane of this disk is disposed at right angle to the axis of lever 26 and is substantially parallel with the outer face of head 14 when said lever occupies horizontal position.

In order to seal bore 15, of plug 13, and the outer end of tubular member 16, a flexible tubular member 35 is secured at its ends to the opposite faces of head 14 and disk 34 so as to hermetically seal the fulcrum 27 of lever 26 and the connection between the ends 26$^b$ and disk 34. This member 35 is formed of a tube of metal circularly convoluted so as to provide a proper degree of flexibility necessary to allow the ends of the flexible member to be angularly disposed relatively to each other. One end of this flexible member number 35 is secured to the outer face of head by soldering or brazing and a ring 36 is fastened to said face by screws 37 and clamps said end of member 35 there against so as to relieve the joint of strain. The other end of member 35 is soldered or brazed to the corresponding face of disk 34 and is further secured thereto by a ring 38 which is held in position by screws 39.

Thus lever 26 and the entrance to the tank are hermetically sealed and the motion of floatable member 20 is transmitted by means of disk 34 which is imperforate. By virtue of this construction it is not necessary to provide any packing glands for any of the operating parts and the danger of leakage is reduced to minimum.

This disk 34 and flexible member 35 are enclosed by an open ended casing 40 which is secured at one end to head 14 by screws 41. A transverse partition wall 40$^a$ is arranged in casing 40 at a point spaced appropriate distance from each end to form an inner chamber 42 containing disk 34 and member 35 and an outer chamber 43 containing switch mechanism 44. The outer chamber 43 is closed by a detachable cap which fits over the outer end of casing 40 and secured thereto by suitable fastening device 46. A conduit fitting 47 is screw threaded laterally in casing 40 to provide access to chamber 43 for electric wires 68 of the signal circuit.

The partition wall 40$^a$ is provided with a central opening 49, through which projects into chamber 43 a pin 50. This pin is fastened to the outer face of disk 34 and extends axially therefrom in the direction opposite to lever 26. Opening 49 is large enough to freely accommodate said pin 50 during its oscillatory movement produced when disk 34 is actuated by lever 26.

The projecting end of pin 50 is disposed in an opening 51 formed in a horizontally disposed oscillatory plate 52. Said plate is pivotally mounted at 53 to one side of opening 51 and has its opposite side provided with an extension 54, which as plate 52 is rocked into either one of its extreme positions, engages respectively one of the resilient contact members 55 and 56 and moves it away from the corresponding stationary contact member 57 or 58 thereby breaking the electric signal circuit controlled by said contacts.

The end of plate 52, disposed opposite to extension 54, is segmentally formed and is provided on its peripheral face with a series of V shaped notches 59, 60, 61 respectively, engageable by a roller 62. This roller is carried by one end of a resilient plate 63, the opposite end of which is fixed to a lateral extension 64 of a supporting plate 65. Roller 62 imparts snap action to plate 52 and further serves to yieldingly hold said plate in one of its three positions. Supporting plate or block 65 is preferably made of insulation material and has the switch mechanism just described mounted thereon so as to provide a compact construction. This block 65 is secured in position in chamber 43 by screws 66.

Plate 52 is preferably pivotally mounted to one side of blocks 65 in spaced relation therewith while contacts 55 and 56 and stationary contacts 57 and 58 are disposed on the opposite side of block 65, movable contacts 55 and 56 being provided with lateral extensions 55ª and 56ª disposed in the path of movement of extension 54 of plate 52.

A tamper switch 67 is interposed in the energizing circuit 68 with which contacts 55, 56 and 57 are associated. This tamper switch consists of a fixed contact 69 connected to one terminal of said circuit 68 and a spring contact 71 connected to contact 55. This spring contact 71 is normally disengaged from contact 69 and closes the circuit when said cap is in position. When, however, cap 45 is removed, contact 71 moves away from contact 69 thereby opening circuit 68. A source of electrical current, such as a battery 72, is arranged in said circuit 68 and serves to energize a solenoid 64 which is interposed in said circuit 68. This solenoid, when energized, maintains a contact 75 away from a stationary contact 76. These two contacts 75 and 76 are connected to the terminals of a signal circuit 77 and preferably connected to the same source of electrical energy 72. A suitable signal 78, which in the present instance, is shown in the form of an electric bell is interposed in circuit 77 and is adapted to be set in operation when the signal circuit 77 is closed. So long as tamper switch 67 and contacts 55, 56 and 57 are closed, solenoid 74 is active and holds contact 75 away from contact 76 so that circuit 77 is open and signal 78 is inactive. However, as soon as circuit 68 is opened, either by moving one of the contacts 55 or 56 away from contact 57, or by moving contact 71 away from contact 69, solenoid 74 becomes de-energized allowing contact 75 to move into engagement with contact 76, thereby closing circuit 77 and setting in operation signal 78. The operation of signal 78 will inform the operator that abnormal conditions exist in that particular tank so that he may investigate the causes thereof.

Figure 3:
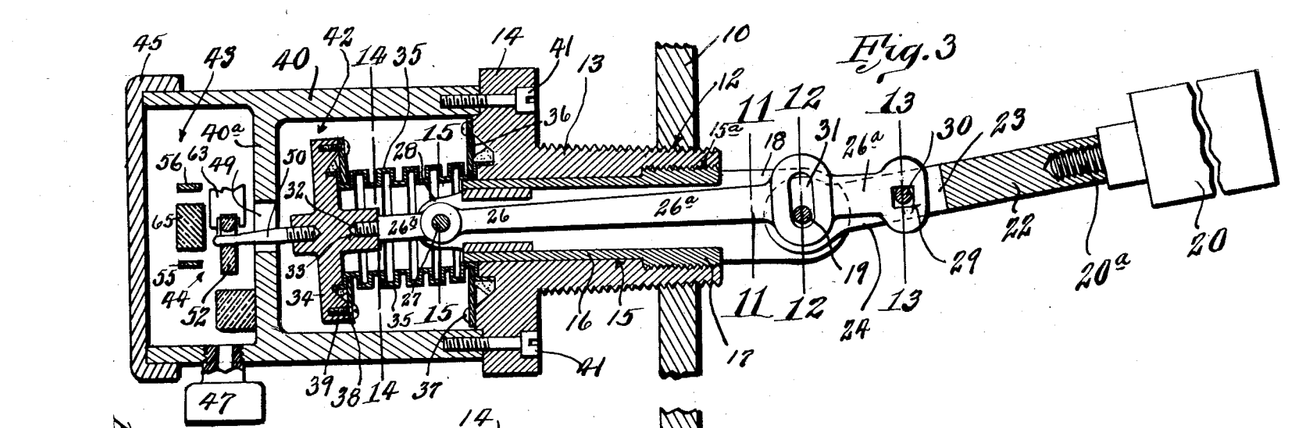
Figure 3 is a longitudinal section through the device showing the floatable member in upward position.
Figure 5:
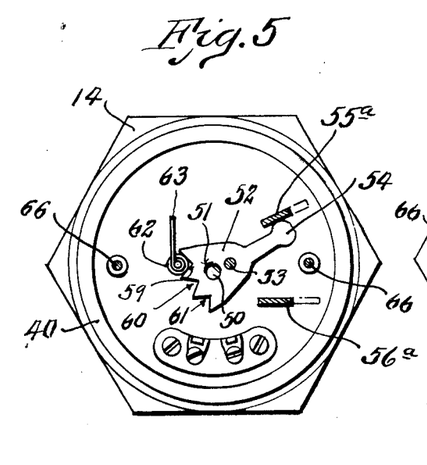
Figure 5 is an end elevation view partly broken away showing switch mechanism occupying position shown in Figure 3.

Thus, when the water in tank 10 rises above a predetermined level, float member 20 occupies raised position (see Figure 3). The upward movement of said member 20 causes lever 26 to rock on fulcrum 27 moving finger or pin 50 downwardly so that plate 52 occupies position shown in Figure 5. In this position, extension 54 moves contact 55 away from stationary contact 57 thereby interrupting or opening circuit 68 and closing circuit 77, which latter sets in operation signal 78.

Figure 4:
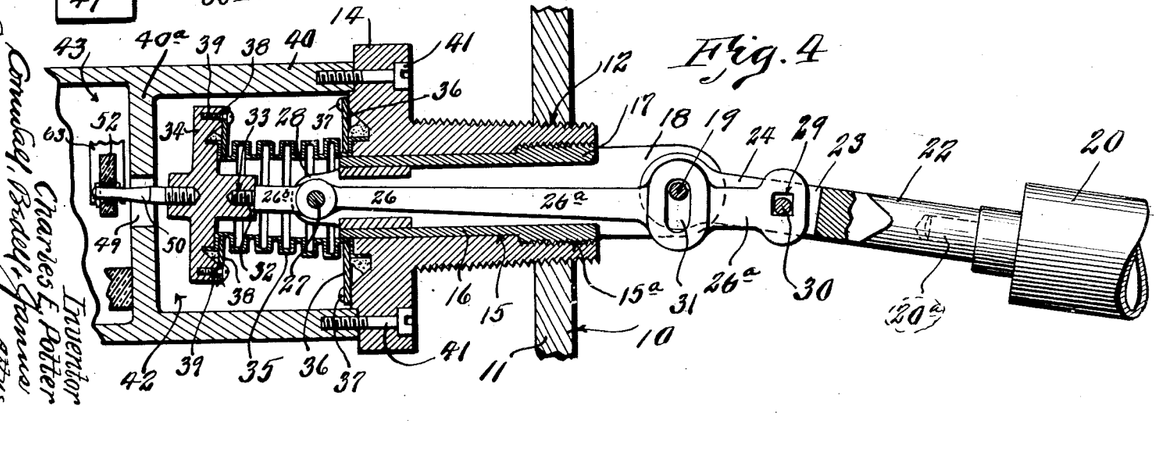
Figure 4 is a similar view, but showing the floatable member occupying the depressed position.
Figure 6:
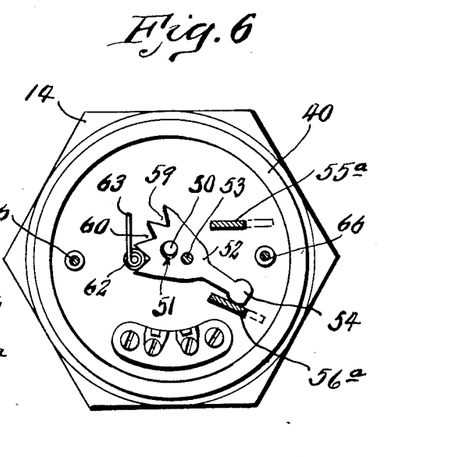
Figure 6 is a similar view, partly broken away showing the switch mechanism occupying position corresponding to Figure 4.
Figures 7, 8, 9:
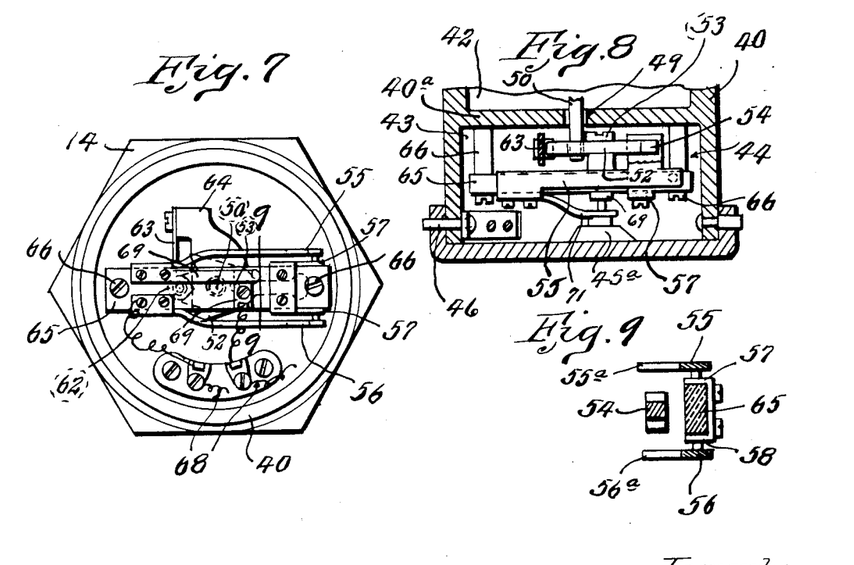
Figure 7 is an end elevation showing the switch mechanism in neutral position.
Figure 8 is a top plan view of the switch mechanism and showing the casing in horizontal cross section.
Figure 9 is an enlarged detail cross-section taken on line 9—9 of Figure 7.
Figure 10:
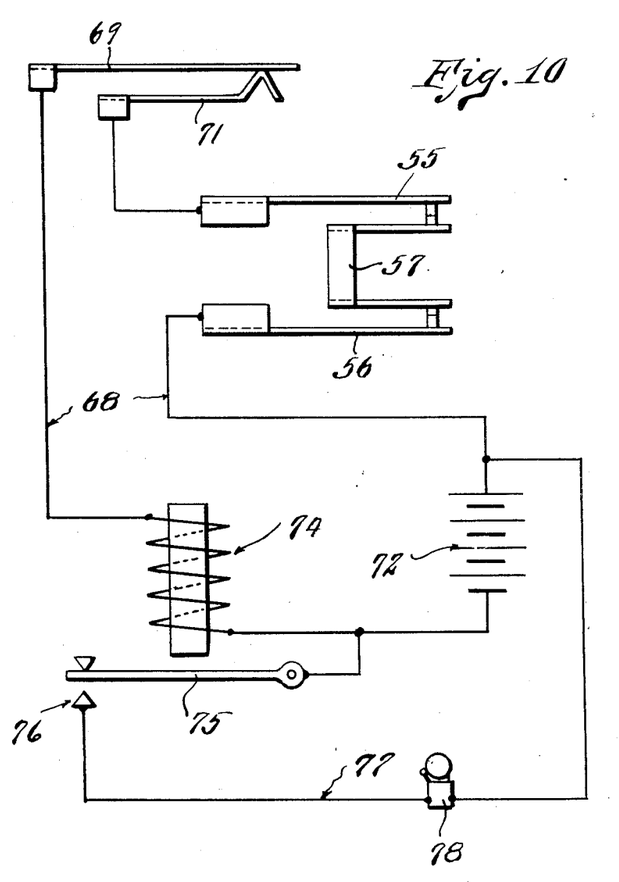
Figure 10 is a diagrammatic view showing the electric connection between the central station and the switch.
Figures 11, 12, 13, 14, 15:
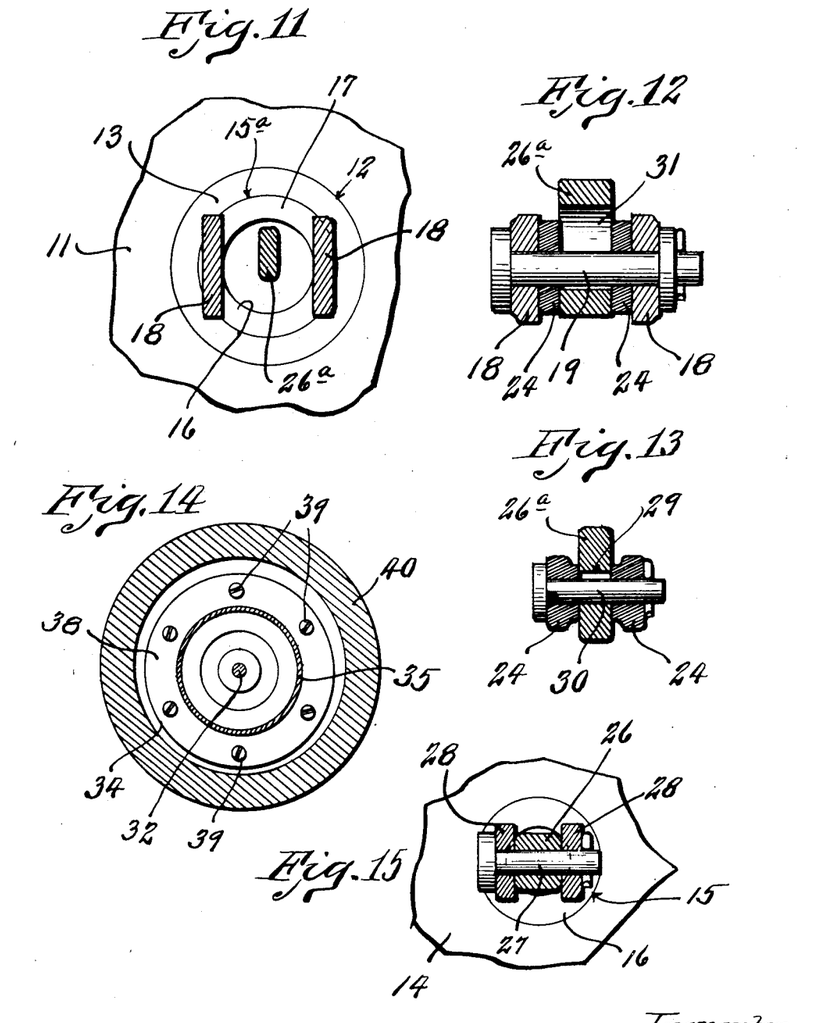
Figure 11 is a vertical cross-section taken on line 11—11 of Figure 3.
Figure 12 is a cross-section taken on line 12—12 of Fig. 3.
Figure 13 is a vertical cross-section taken on line 13—13 of Figure 3.
Figure 14 is a vertical cross-section taken on line 14—14 of Figure 3.
Figure 15 is a vertical cross-section taken on line 15—15 of Figure 3.

Similarly, if the water in tank 10 falls below the predetermined level, circuit 68 will be opened, due to the fact that contact 56 is displaced by plate 52 which is rocked in opposite directions (see Figure 6) on account of the floatable member 20 being depressed and parts associated therewith being actuated accordingly (see Figure 4).

The levels, at which floatable member 20 operates lever 26, are spaced suitable distance apart to provide a neutral zone during the occupation of which by member 20 no action takes place. In this manner, minor variations in the level of the water do not operate the signal 78.

My improved gravity tank float device, is accurate in operation, is of compact construction so that it may be readily mounted in place, is safeguarded against tampering by unauthorized persons, and is so constructed as to reduce the danger of leakage from the tank through the device to minimum.

While I have shown the preferred form of my device, I am aware that my invention may be embodied in other specific forms without departing from the spirit of my invention.

I claim:

1. A float device comprising a mounting attachable to a wall of a tank, a floatable member pivotally mounted on said mounting and adapted to be disposed within said tank, a lever fulcrumed in said mounting and having one end operatively connected with said floatable member, an electric switch operable by the opposite end of said lever in accordance with said floatable member.

2. A float device comprising a mounting attachable to a wall of the tank and extending thereinto, a floatable member disposed in said tank and pivotally mounted on said mounting, a lever fulcrumed on said mounting and operatively connected with said floatable member at a point spaced from the pivot thereof and an electro-responsive signal means controlled by said lever in accordance with the position of said floatable member.

3. A gravity float device comprising a mounting fixed to a wall of a tank and opening thereinto, a floatable member disposed within said tank and pivotally mounted on the inner end of said mounting, a lever fulcrumed on said mounting at a point spaced apart from said pivot and having operative engagement with said floatable member, and an electric switch carried by said mounting and operable by said lever in accordance with the movement of said floatable member.

4. A gravity float device comprising a mounting, a floatable member pivotally mounted on one end of said mounting, a lever fulcrumed on the opposite end of said mounting and having one end operatively connected to said floatable member at a point spaced from the pivot thereof, an electric switch fixed in said mounting, and a connection associated with the opposite end of said lever and with said switch for actuating the latter in co-relation with the actuation of said floatable member.

5. A gravity float device comprising a mounting, a floatable member operatively mounted on one end of said mounting, a lever operatively mounted at the opposite end of said mounting and having one end extending through said mounting for operative engagement with said floatable member, a rigid member fixed to the opposite end of said lever, a casing secured to said mounting and enclosing said rigid member and the fulcrum of said lever, and an electric switch disposed in said casing and operatively connected to said rigid member whereby said switch is actuated in accordance with the actuation of said floatable member.

6. A gravity float device comprising a mounting adapted to be fixed to a tank, a floatable member pivotally mounted on one end of said mounting and adapted to be disposed within said tank, a lever fulcrumed on the opposite end of said mounting and having one end projecting beyond the pivot of said floatable member for operative engagement with the latter, a rigid disk fixed to the opposite end of said lever, a tubular flexible member secured at its ends to the opposed faces of said disk and said mounting for hermetically sealing said lever, a casing secured to said mounting for enclosing said disk and said flexible member, a signal circuit controlling switch disposed in said casing, and a projection extending from said disk and in engagement with said switch for operating the latter in accordance with the disposition of said floatable member.

7. A gravity float device comprising a mounting a floatable member movably carried by one end of said mounting, a lever fulcrumed at the opposite end of said mounting and having one end operatively connected to said floatable member, a rigid disk fixed to the opposite end of said lever, a switch mechanism operable by said disk, and a flexible member hermetically attached to said disk for forming a fluid tight seal between said lever and said switch mechanism.

8. A gravity float device comprising a mounting, a floatable member movably carried by one end of said mounting, a lever fulcrumed in said mounting and operable by said floatable member, a disk fixed to one end of said lever, a switch mechanism disposed in spaced relation with said lever, and a flexible metallic member hermetically attached to said disk for forming a fluid tight seal between said lever and said switch mechanism.

9. A gravity float device comprising a mounting, a floatable member movably carried by said mounting, a lever fulcrumed in said mounting and having one end operatively connected to said floatable member, a disk fixed to the opposite end of said lever, a casing attached to said mounting for enclosing said disk and said lever, an electric switch carried by said casing, and a flexible member hermetically attached to said disk for forming a fluid tight seal between said lever and said switch mechanism.

10. A gravity float device comprising a mounting attachable to and extending into a tank, a floatable member movably carried by said mounting and disposed within said tank, a lever fulcrumed in said mounting and having one end operable by said floatable member, an imperforate rigid member carried by the opposite end of said lever and disposed laterally of the axis thereof, a flexible metallic member hermetically attached to said rigid member for hermetically sealing said tank and said lever against atmosphere, and a signal mechanism controlled by said rigid imperforate member in accordance with the disposition of said floatable member.

11. A float device for tanks comprising a hollow mounting attachable at one end to and opening into a tank, a floatable member pivotally mounted on said end of said mounting and disposed within said tank, a lever fulcrumed in said mounting and having one end operatively connected to said floatable member, a rigid imperforate disk carried by the opposite end of said lever, a flexible tubular member having its ends in sealing engagement with the opposed faces of said disk and said mounting for hermetically sealing said tank and said lever against atmosphere, and a signal mechanism operable by said disk in accordance with the movement of said floatable member.

12. A float device for tanks comprising a hollow mounting attachable at one end to and opening into a tank, a floatable member pivotally mounted on said end of said mounting and disposed within said tank, a lever fulcrumed in said mounting and having one end operatively connected to said floatable member, a rigid imperforate disk carried by the opposite end of said lever, a flexible tubular member having its ends in sealing engagement with the opposed faces of said disk and said mounting for hermetically sealing said tank and said lever against atmosphere, an electric switch mechanism, and operative connection between said disk and said switch mechanism for actuating the latter in accordance with the rise or fall of said floatable member.

13. A float device for tanks comprising a hollow mounting attachable at one end to and opening into a tank, a floatable member pivotally mounted on said end of said mounting and disposed within said tank, a lever fulcrumed in said mounting and having one end operatively connected to said floatable member, a rigid imperforate disk carried by the opposite end of said lever, a flexible tubular member having its ends in sealing engagement with the opposed faces of said disk and said mounting for hermetically sealing said tank and said lever against atmosphere, a casing secured to the outer end of said mounting for enclosing said disk and said flexible member, an electric switch mounted in said casing, and a pin fixed to and extending outwardly from the face of said disk for actuating said switch mechanism in accordance with the movement of said floatable member.

14. In a gravity float device for tanks, the combination with a tank having an opening in one of its walls, of a mounting having a tubular extension secured in said opening, a floatable member disposed in said tank and movably mounted on said extension, a lever fulcrumed in said mounting and having one end projecting through said tubular extension into said tank and operatively connected to said floatable member, and a switch mechanism disposed exteriorly of said tank and operatively connected to said lever, whereby said switch is actuated by said lever in accordance with the movement of said floatable member.

15. In a gravity float device for tanks, the combination with a tank having an opening in one of its walls, of a mounting having a tubular extension screw seated in said opening and extending into said tank, a gravity actuated floatable member arranged in said tank and pivotally mounted on said extension, an electric signal circuit, a switch for controlling said circuit and arranged exteriorly of said tank, and operative connections between said floatable member and said switch for actuating the latter in accordance with the movement of said floatable member.

16. In a gravity float device for tanks, the combination with a tank having an opening in one of its walls, of a mounting having a tubular extension screw seated in said opening and extending into said tank, a gravity actuated floatable member arranged in said tank and pivotally mounted on said extension, an electric signal circuit, a switch for controlling said circuit and arranged exteriorly of said tank, an imperforate member interposed in said operative connection, and a flexible tubular member hermetically attached to said tank and to said imperforate member for providing a seal between the interior of said tank and said switch.

17. In a gravity float device for tanks, the combination of a mounting adapted to be attached to a wall of a tank, a floatable member pivotally mounted on one end of said mounting and adapted to be disposed in said tank, a lever fulcrumed in said mounting and having operative connection with said floatable member, and a switch mechanism secured to said mounting and operatively connected to said lever whereby said switch is actuated in accordance with the movement of said floatable member.

18. In a gravity float device for tanks, the combination of a mounting adapted to be attached to a wall of a tank, a floatable member pivotally mounted on one end of said mounting and adapted to be disposed in said tank, a lever fulcrumed in said mounting and having operative connection with said floatable member, an imperforate member fixed to one end of said lever, a flexible tubular member hermetically attached at its ends to the opposite faces of said member and said mounting to seal the lever opening in said mounting, and signal means controlled by said switch.

19. In a gravity float device for tanks, the combination with a tank having an opening in one of its walls, of a mounting having a tubular extension entering said tank through said opening, a gravity actuated floatable member pivotally mounted on said extension within said tank, a lever fulcrumed in said mounting and having one end projecting through said tubular extension into said tank and operatively connected to said floatable member, an imperforate member engageable by the opposite end of said lever, an electric switch mechanism operatively connected to said imperforate member, and a flexible member secured to said imperforate member for hermetically sealing said lever and said tubular extension.

20. A float device comprising a mounting having an externally threaded tubular extension adapted to be screw seated in the wall of a tank, a tubular member disposed within said tubular extension, a pair of lugs projecting from the inner end of said tubular member into said tank, a floatable member pivotally mounted on said lugs, a lever fulcrumed on the opposite end of said tubular member and having one end extending therethrough into said tank, means for operatively connecting said end of said lever to said floatable member, a rigid disk coaxially carried by the opposite end of said lever, and an electric switch carried by said mounting and operatively connected to said disk for actuation in accordance with the movements of said floatable member.

21. A float device comprising a mounting having an externally threaded tubular extension adapted to be screw seated in a wall of a tank, a tubular member disposed within said tubular extension, a pair of lugs projecting from the inner end of said tubular member into said tank, a floatable member pivotally mounted on said lugs, a lever fulcrumed on the opposite end of said tubular member and having one end extending therethrough into said tank, means for operatively connecting said end of said lever to said floatable member, a rigid disk coaxially carried by the opposite end of said lever, and a tubular flexible member secured at its ends respectively to said mounting and to said disk for hermetically sealing said lever and said tubular member.

22. In the device of the class described, the combination with a signal circuit, of a switch therefor, a mounting adapted to be secured to the wall of a tank, a tubular member carried by said mounting and extending into said tank, a floatable member disposed in said tank and pivotally mounted on one end of said tubular member, a lever fulcrumed on the opposite end of said tubular member and extending therethrough and operatively connected with said floatable member, whereby said lever is actuated thereby, and operative connections between the opposite end of said lever and said switch for actuating the latter in accordance with the movement of said floatable member.

23. In the device of the class described, the combination with a signal circuit, of a switch therefor, a mounting adapted to be secured to a wall of a tank, a tubular member carried by said mounting and extending into said tank, a floatable member disposed in said tank and pivotally mounted on one end of said tubular member, a lever fulcrumed on the opposite end of said tubular member and extending therethrough and operatively connected with said floatable member, whereby said lever is actuated thereby, operative connections between the opposite end of said lever and said switch for actuating the latter in accordance with the movement of said floatable member, and a tubular circumferentially convoluted member cooperative with said operative connections for enclosing and hermetically sealing said lever and said tubular member.

24. In a device of the class described, the combination with a tank, of a mounting attached thereto, a tubular member carried by said mounting and opening into said tank, a pair of lugs formed on the inner end of said tubular member, a gravity actuated floatable member disposed in said tank and pivotally carried by said lugs, a lever fulcrumed adjacent to the opposite end of said tubular member and having one end extending therethrough into said tank, an operative connection connecting said end of said lever with said floatable member, whereby said lever is actuated thereby, an electric switch mechanism operable by the opposite end of said lever, and means hermetically interposed between said switch and said tank, for sealing the latter.

25. In a device of the class described, the combination with a tank, of a mounting attached thereto, a tubular member carried by said mounting and opening into said tank, a pair of lugs formed on the inner end of said tubular member, a gravity actuated floatable member disposed in said tank and pivotally carried by said lugs, a lever fulcrumed adjacent to the opposite end of said tubular member and having one end extending therethrough into said tank, an operative connection connecting said end of said lever with said floatable member, whereby said lever is actuated thereby, an electric switch mechanism operable by the opposite end of said lever, and a flexible tubular member secured to said mounting and interposed between said lever and said switch and cooperating therewith for forming a fluid tight seal therebetween.

26. In a device of the class described, the combination with a tank of a mounting attached thereto, a tubular member carried by said mounting and opening into said tank, a pair of lugs formed on the inner end of said tubular member, a gravity actuated floatable member disposed in said tank, a shank secured at one end to said floatable member and having its opposite end bifurcated and pivotally mounted on said lugs, a lever fulcrumed adjacent to the opposite end of said tubular member and having one end extending therethrough into said tank and operatively connected to said shank past the pivotal mounting thereof, whereby said lever is actuated in accordance with the movement of said floatable member, and a signal circuit switch mechanism operable by the opposite end of said lever.

27. In a device of the class described, the combination with the tank, of a floatable member pivotally disposed therein, an operative lever operable in said floatable member and extending outwardly from said tank, a signal circuit, and an electric switch for controlling said circuit and operable by said lever to open and close said circuit in accordance with the position of said floatable member.

28. In a device of the class described, the combination with the tank, of a floatable member pivotally disposed therein, an operative lever operable in said floatable member and extending outwardly from said tank, a signal circuit, an electric switch for controlling said circuit and operable by said lever to open and close said circuit in accordance with the position of said floatable member, and means cooperating with said lever and hermetically sealing the point of egress of said lever from said tank.

29. In a device of the class described, the combination with a tank, of a stationary mounting fixed thereto, a floatable member arranged in said tank, an operative member carried by said mounting and extending into said tank for operative engagement with said floatable member, a switch mechanism carried by said mounting and operable by said operative member in accordance with the movement of said floatable member, and and a tubular flexible member enclosing said operative member and cooperating therewith for hermatically sealing the point of egress from said tank.

30. In a device of the class described, the combination with a tank, of a stationary mounting fixed thereto and having an open tubular extension extending into said tank, a floatable member disposed in said tank and pivotally mounted on said end of said tubular extension, an operative member carried by said mounting and extending through said tubular extension into said tank, means for operatively connecting said operative means with said floatable member, a switch mechanism carried by said mounting and means for operatively interengaging the outer end of said operative means with said switch whereby the latter is actuated in accordance with the position of said floatable member, said means including a flexible member interposed between said switch and said operative member to form a fluid tight joint therebetween.

In testimony whereof I hereunto affix my signature this 12th day of January, 1928.

CHARLES E. POTTER.